(12) United States Patent
Yang

(10) Patent No.: US 12,259,620 B2
(45) Date of Patent: Mar. 25, 2025

(54) DISPLAY PANEL, MANUFACTURING METHOD OF DISPLAY PANEL, AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Yuhua Yang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,131

(22) PCT Filed: May 31, 2022

(86) PCT No.: PCT/CN2022/096421
§ 371 (c)(1),
(2) Date: Jun. 29, 2022

(87) PCT Pub. No.: WO2023/221176
PCT Pub. Date: Nov. 23, 2023

(65) Prior Publication Data
US 2024/0192554 A1    Jun. 13, 2024

(30) Foreign Application Priority Data

May 16, 2022 (CN) .......................... 202210526490.3

(51) Int. Cl.
*G02F 1/1335* (2006.01)
*G02F 1/1333* (2006.01)
(Continued)

(52) U.S. Cl.
CPC .. *G02F 1/136209* (2013.01); *G02F 1/133354* (2021.01); *G02F 1/133514* (2013.01);
(Continued)

(58) Field of Classification Search
CPC ......... G02F 1/136209; G02F 1/133354; G02F 1/133514; G02F 1/133528; G02F 1/1345
See application file for complete search history.

(56) References Cited

U.S. PATENT DOCUMENTS

| | | | | |
|---|---|---|---|---|
| 2013/0271958 A1* | 10/2013 | Jang | ......................... | H05K 7/02 361/767 |
| 2014/0160694 A1* | 6/2014 | Yoon | ...................... | G02F 1/1339 361/749 |
| 2022/0373836 A1* | 11/2022 | Hirai | .................. | G02F 1/136286 |

FOREIGN PATENT DOCUMENTS

| CN | 108957878 A | 12/2018 |
|---|---|---|
| CN | 112526792 A | 3/2021 |

(Continued)

OTHER PUBLICATIONS

International Search Report in International application No. PCT/CN2022/096421, mailed on Dec. 23, 2022.
(Continued)

*Primary Examiner* — James A Dudek
(74) *Attorney, Agent, or Firm* — PV IP PC; Wei Te Chung

(57) ABSTRACT

A display panel, a manufacturing method of the display panel, and a display device are disclosed. The display panel includes an array substrate with an adjacent pixel circuit area and a bonding area, a color film substrate arranged opposite to the pixel circuit area of the array substrate, a shielding structure covering the bonding area and fixedly connected with at least the array substrate located in the bonding area, and a first polarizer located on the color film substrate and (Continued)

the shielding structure. A side of the first polarizer close to the bonding area is flush with a side of the shielding structure.

17 Claims, 5 Drawing Sheets

(51) Int. Cl.
  *G02F 1/1345* (2006.01)
  *G02F 1/1362* (2006.01)
(52) U.S. Cl.
  CPC ...... *G02F 1/133528* (2013.01); *G02F 1/1345* (2013.01); *G02F 2202/28* (2013.01)

(56) References Cited

FOREIGN PATENT DOCUMENTS

| | | |
|---|---|---|
| CN | 113193136 A | 7/2021 |
| CN | 113419373 A | 9/2021 |
| CN | 113674622 A | 11/2021 |
| JP | 2009069806 A | 4/2009 |

OTHER PUBLICATIONS

Written Opinion of the International Search Authority in International application No. PCT/CN2022/096421, mailed on Dec. 23, 2022.
Chinese Office Action issued in corresponding Chinese Patent Application No. 202210526490.3 dated May 10, 2023, pp. 1-7.

* cited by examiner

DISPLAY PANEL, MANUFACTURING METHOD OF DISPLAY PANEL, AND DISPLAY DEVICE

BACKGROUND

Field of Invention

The present application relates to a field of display technology, in particular, to a display panel, a manufacturing method of the display panel, and a display device.

Description of Prior Art

Liquid crystal displays (LCDs) have advantages such as high image quality, small volume, light weight, low voltage driven, low power consumption, and wide application range. Therefore, the LCDs have been widely used in consumer electronics or computer products such as portable TV, mobile phone, video recorder and player, notebook computer, and desktop display etc., and have become a mainstream of displays. A traditional architecture of the LCDs mainly comprises an outer frame, an LCD panel, a circuit board, and a backlight module. At present, display products are pursuing an extreme ultra narrow frame or even no frame, but according to an internal wiring requirement of the existing LCD panel, it can only achieve no frame on three sides, and a ground side cannot achieve no-frame due to an existence of a bonding area.

In order to improve visual effect, a front frame of the ground side of the panel shall be made as small as possible, and a metal decorative strip shall be arranged on the ground side as the front frame to ensure that an appearance surface is flush. However, a color of the front frame cannot be consistent with a color of the panel, so there is a color difference visually, and it is impossible to truly realize no frames on four sides.

SUMMARY

The present application provides a display panel, a manufacturing method of the display panel, and a display device, which can visually realize a design of a four-sided frameless display panel.

First aspect, the present application provides a display panel, comprising:
an array substrate, comprising a pixel circuit area and a bonding area located on a side of the pixel circuit area;
a color film substrate, arranged opposite to the pixel circuit area of the array substrate;
a shielding structure, covering the bonding area and fixedly connected with
at least the array substrate located in the bonding area;
a first polarizer, located on the color film substrate and the shielding structure, and a side of the first polarizer close to the bonding area being flush with a corresponding side of the shielding structure.

In the display panel provided in the present application, the shielding structure comprises a main structure covering the bonding area and a toner layer arranged on the main structure; a material of the toner layer comprises an ink material.

In the display panel provided in the present application, the display panel further comprises a flexible circuit board; a part of the flexible circuit board is bound and connected with the bonding area of the array substrate, and another part is bent to a side of the array substrate;

the main structure further extends to the side of the array substrate and is arranged parallel to the side of the array substrate, and the main structure on the side of the array substrate at least partially covers the flexible circuit board on the side of the array substrate.

In the display panel provided in the present application, a decorative coating layer is arranged on a side of the toner layer away from the pixel circuit area; the decorative coating layer extends to a side part of the main structure.

In the display panel provided in the present application, wherein a material of the decorative coating layer comprises a UV curing adhesive.

In the display panel provided in the present application, wherein an adhesive layer is arranged between the shielding structure located in the bonding area and the array substrate.

In the display panel provided in the present application, the display panel further comprises a liquid crystal layer located between the array substrate and the color film substrate, and a second polarizer located on a side of the array substrate away from the liquid crystal layer.

Second aspect, the present application further provides a manufacturing method of a display panel, comprising following steps:
providing an array substrate and a color film substrate aligned to form a cell; wherein the array substrate comprises a pixel circuit area and a bonding area located on a side of the pixel circuit area, and the color film substrate is arranged corresponding to the pixel circuit area;
arranging a shielding structure on the array substrate located in the bonding area; wherein the shielding structure covers the bonding area and is fixedly connected with at least the array substrate located in the bonding area; and
arranging a first polarizer on the color film substrate and the shielding structure; wherein a side of the first polarizer close to the bonding area is flush with a corresponding side of the shielding structure.

In the manufacturing method of the display panel provided in the present application, the step of arranging the shielding structure on the array substrate located in the bonding area comprises following steps:
providing a main structure; wherein the main structure comprises a first main part arranged corresponding to the bonding area and a second main part connected at a right angle to the first main part;
forming a toner layer on a surface of the first main part; wherein the toner layer and the main structure constitute the shielding structure;
bonding a flexible circuit board in the bonding area of the array substrate, and bending a part of the flexible circuit board away from the bonding area to a side of the array substrate; and
fixing the first main part on the array substrate and the flexible circuit board located in the bonding area, so that the toner layer is located on a side of the first main part away from the array substrate, and the second main part at least partially covers the flexible circuit board located on the side of the array substrate.

In the manufacturing method of the display panel provided in the present application, a material of the toner layer comprises an ink material.

In the manufacturing method of the display panel provided in the present application, the first main part is fixed on the array substrate and the flexible circuit board located in the bonding area through an adhesive layer.

In the manufacturing method of the display panel provided in the present application, the manufacturing method further comprises following steps:

arranging a second polarizer on a side of the array substrate away from the color film substrate; and arranging a decorative coating layer on a side of the toner layer away from the pixel circuit area; wherein the decorative coating layer extends to a side part of the main structure.

In the manufacturing method of the display panel provided in the present application, a material of the decorative coating layer comprises a UV curing adhesive.

Third aspect, the present application further provides a display device, comprising the display panel according to claim 1 and a backlight module; wherein the display panel is located on the backlight module, and the color film substrate is located on a side of the array substrate away from the backlight module.

In the display device provided by the present application, the shielding structure comprises a main structure covering the bonding area and a toner layer arranged on the main structure; a material of the toner layer comprises an ink material.

In the display device provided by the present application, the display panel further comprises a flexible circuit board; a part of the flexible circuit board is bound and connected with the bonding area of the array substrate, and another part is bent to a side of the array substrate;

the main structure further extends to the side of the array substrate and is arranged parallel to the side of the array substrate, and the main structure on the side of the array substrate at least partially covers the flexible circuit board on the side of the array substrate.

In the display device provided by the present application, a decorative coating layer is arranged on a side of the toner layer away from the pixel circuit area; the decorative coating layer extends to a side part of the main structure.

In the display device provided by the present application, a material of the decorative coating layer comprises a UV curing adhesive.

In the display device provided by the present application, an adhesive layer is arranged between the shielding structure located in the bonding area and the array substrate.

In the display device provided by the present application, wherein the display panel further comprises a liquid crystal layer located between the array substrate and the color film substrate, and a second polarizer located on a side of the array substrate away from the liquid crystal layer.

Compared with the prior art, the display panel, the manufacturing method of the display panel, and the display device provided in the present application hide the shielding structure under the first polarizer, simplify technical difficulties of four-sided frameless display panel, maintain a consistency of edge colors of four sides of a front of the display panel, reduce a color difference and an appearance difference of the four sides of the display panel, and improve picture quality of a whole machine. Moreover, the present application arranges the shielding structure in the bonding area below the first polarizer on a basis of a traditional display panel process. On the one hand, compared with the four-sided frameless display panel scheme with the array substrate facing upward, the present application has little change to a cell process of the display panel, and there is no need to design the cell specifically, which can greatly reduce cost. On the other hand, the scheme of the present application has good compatibility and can be applied to most display panel processes.

DETAILED DESCRIPTION OF PREFERRED EMBODIMENTS

Figure 1:
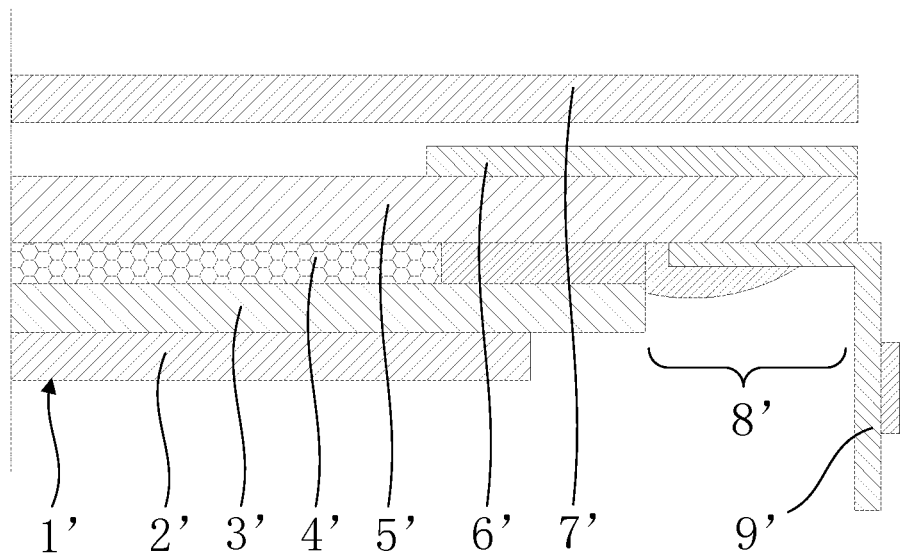
FIG. 1 is a partial schematic structural diagram of an exemplary liquid crystal display panel with an array substrate facing upward.

In the following, the technical scheme in the embodiments of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the orientation or positional relationship indicated by the terms "center", "length", "width", "up", "down", "front", "back", "left", "right", "inside", "outside" is based on an orientation or a positional relationship shown in the attached drawings, only for the convenience of describing the present application and simplifying the description, rather than indicating or implying that the device or element referred to must have a specific orientation constructed and operated in a specific orientation, therefore, it cannot be understood as a restriction on the present application. In addition, the terms "first" and "second" are only used for descriptive purposes and cannot be understood as indicating or implying relative importance or implicitly indicating the number of indicated technical features. Thus, the features defining "first" and "second" can explicitly or implicitly comprise one or more of the features. In the description of the present application, "multiple" means two or more, unless otherwise expressly and specifically defined.

In the description of the present application, it should be noted that unless otherwise clearly specified and limited, the terms "installation", "connection", and "connection" should be understood in a broad sense, for example, it can be fixed connection, removable connection, or integrated connection; It can be mechanical connection, electrical connection, or mutual communication; It can be directly connected or indirectly connected through an intermediate medium. It can be a connection within two elements or an interaction relationship between two elements. For those skilled in the art, the specific meaning of the above terms in the present application can be understood according to a specific circumstance.

In the present application, unless otherwise expressly provided and limited, a first feature "above" or "below" of a second feature can comprise direct contact between the first feature and the second feature, or through another feature contact between them. Moreover, the first feature is "above" of the second feature, comprising that the first feature is directly above and obliquely above the second feature, or only indicates that a horizontal height of the first feature is higher than a horizontal height of the second feature. The first feature is "below" of the second feature, comprising that the first feature is directly below and obliquely below the second feature, or only indicates that the horizontal height of the first feature is less than the horizontal height of the second feature.

The following disclosure provides many different embodiments or examples to implement different structures of the present application. In order to simplify the disclosure of the present application, the components and settings of specific examples are described below. Of course, they are merely examples and are not intended to limit the present application. In addition, the present application can repeat reference numbers and/or reference letters in different examples for a purpose of simplification and clarity, which itself does not indicate a relationship between the various embodiments and/or settings discussed. In addition, the present application provides examples of various specific processes and materials, but those skilled in the art can be aware of applications of other processes and/or uses of other materials.

There are two forms of liquid crystal panels, which are respectively defined as a cell and an open cell (OC) in industry. The cell is a liquid crystal cell formed by sealing and assembling liquid crystals sandwiched between two glass substrates. Its appearance is no different from that of ordinary thin glass. The open cell configures various interfaces on a basis of the cell to connect external signal sources, etc., but the open cell does not comprise a backlight, a frame, and other components in a liquid crystal module (LCM). Usually, the open cell is connected to a circuit board (such as a PCB board) through a flexible circuit board (such as chip-on-film, COF, encapsulation).

In order to realize a frameless design of four sides of a liquid crystal panel, FIG. 1 provides an exemplary liquid crystal display panel 1' with an array substrate facing upward. As shown in FIG. 1, the liquid crystal display panel 1' successively comprises a color film side polarizer 2', a color film substrate 3', a liquid crystal layer 4', an array substrate 5', an ink layer 6', and an array side polarizer 7' from bottom to top. The array substrate 5' has a bonding area 8' protruding from the color film substrate 3', and the liquid crystal display panel 1' further comprises a flexible circuit board (such as COF) 9' bound and connected with the array substrate 5' located in the bonding area 8'. Specifically, the ink layer 6' covers the bonding area 8' and other non-display area, and the array side polarizer 7' covers the array substrate 5'.

Although the liquid crystal display panel 1' shown in FIG. 1 can realize a visual four side frameless design, the design needs a targeted design cell, that is, it needs to make major changes to a manufacturing process of a traditional liquid crystal display panel, resulting in a significant increase in production cost and is not conducive to improving production efficiency.

In order to solve the above technical problems, the present application provides a display panel, a manufacturing method of the display panel, and a display device. After the manufacturing process of the traditional liquid crystal cell, a manufacturing process of a shielding structure is added, so that the shielding structure is located below the color film side polarizer, which not only can realize the visual frameless design, but also save cost and improve the production efficiency. For details, refer to descriptions of the following embodiments.

Figure 2:
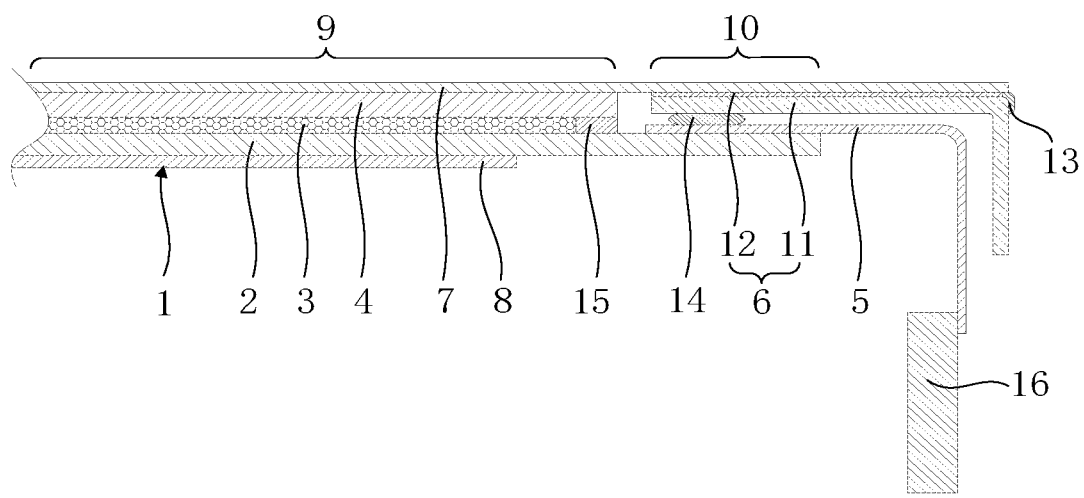
FIG. 2 is a partial schematic structural diagram of a display panel provided by the embodiments of the present application.

As shown in FIG. 2, the embodiments of the present application provide an OC display panel 1 with a color film substrate facing upward. The display panel 1 comprises an array substrate 2, a liquid crystal layer 3, a color film substrate 4, a flexible circuit board 5, a shielding structure 6, a first polarizer 7, and a second polarizer 8. Specifically, the array substrate 2 comprises a pixel circuit area 9, and a bonding area 10 located on a side of the pixel circuit area 9. The color film substrate 4 is arranged opposite to the pixel circuit area 9 of the array substrate 2. The liquid crystal layer 3 is sandwiched between the array substrate 2 and the color film substrate 4. A part of the flexible circuit board 5 is bound and connected with the bonding area 10 of the array substrate 2, and another part is bent to a side of the array substrate 2 (e.g., a side away from the pixel circuit area 9). The shielding structure 6 covers the bonding area 10 and is fixedly connected with at least the array substrate 2 located in the bonding area 10. The first polarizer 7 is located on the color film substrate 4 and the shielding structure 6, and a side of the first polarizer 7 close to the bonding area 10 is flush with a corresponding side of the shielding structure 6. The second polarizer 8 is located on a side of the array substrate 2 away from the liquid crystal layer 3.

It can be understood that an orthographic projection of the first polarizer 7 on the array substrate 2 covers an orthographic projection of the shielding structure 6 on the array substrate 2.

Specifically, the pixel circuit area 9 comprises a plurality of pixel circuit units distributed in an array. The bonding area 10 comprises a plurality of bonding terminals, and the plurality of bonding terminals are electrically connected with the plurality of pixel circuit units for transmitting electrical signals.

Generally, the array substrate or the color film substrate of the display panel is provided with a light shielding layer (such as black matrix, BM), and the light shielding layer will extend to a non-display area on the four sides of the display panel, so that the four sides of the display panel appears to have a narrow black frame. A frame to realize the four sides of the display panel without frames mentioned in the present application refers to a decorative frame additionally arranged on the four sides of the display panel, which is different from the frame formed by the light shielding layer in the array substrate or color film substrate.

Specifically, a surface color of the shielding structure 6 located in the bonding area 10 is consistent with a color of the above light shielding layer, so that there is no color difference in the appearance of front four sides of the display panel 1, and an overall consistency of the four sides of the panel is maintained.

Specifically, a structure formed by the array substrate 2, the liquid crystal layer 3, the color film substrate 4, and the flexible circuit board 5 in the embodiments of the present application is a traditional OC liquid crystal display panel structure. It can be understood that on a basis of the traditional OC liquid crystal display panel, the embodiments of the present application arranges the shielding structure 6 on the first polarizer 7 and the flexible circuit board 5 located in the bonding area 10, and the first polarizer 7 extends to cover the shielding structure 6, so that the shielding structure 6 is hidden below the first polarizer 7. This design does not need to make major changes to a traditional cell process, reduces technical difficulties of the frameless design on the four sides of the display panel, and ensures that an appearance of the bonding area of the display panel is consistent with the colors of other three sides, realizing the frameless design on the four sides.

Specifically, the shielding structure 6 comprises a main structure 11 covering the bonding area 10, and a toner layer 12 arranged on the main structure 11. A color of the toner layer 12 is consistent with the color of the light shielding layer of the non-display area of the display panel 1 (such as the four sides frame area or the four sides), which reduces a color difference and an appearance difference of the four sides of the display panel 1, so as to visually realize a design of the four-side borderless display panel.

Specifically, a material of the main structure 11 comprises but is not limited to metal materials.

Specifically, a material of the toner layer 12 comprises an ink material, such as black ink. Of course, in other embodiments, the material of the toner layer 12 can also be a metal oxide or other material, which is not limited here.

In a specific embodiment, as shown in FIG. 2, the main structure 11 further extends to the side of the array substrate 2 and is arranged parallel to the side of the array substrate 2. The main structure 11 located on the side of the array substrate 2 at least partially covers the flexible circuit board 5 located on the side of the array substrate 2. It can be understood that a longitudinal section of the main structure 11 is an inverted L-shape. This design enables the main structure 11 to effectively protect the flexible circuit board 5 and prevent the flexible circuit board 5 from being scratched or pulled and damaged.

It should be noted that in the embodiments of the present application, the side of the array substrate 2 refers to a side of the array substrate 2 away from the pixel circuit area 9 in an arrangement direction of the pixel circuit area 9 and the bonding area 10.

Specifically, a decorative coating layer 13 is arranged on a side of the toner layer 12 away from the pixel circuit area 9. The decorative coating layer 13 can extend to a side portion of the main structure 11. A material of the decorative coating layer 13 comprises UV curing adhesive or similar hot melt adhesive. The decorative coating layer 13 can further optimize the appearance of the display panel 1. It can be understood that the decorative coating layer 13 can be arranged on all three exposed sides of the toner layer 12.

Specifically, an adhesive layer 14 is arranged between the shielding structure 6 located in the bonding area 10 and the array substrate 2. A material of the adhesive layer 14 comprises but is not limited to UV curing adhesive. It can be understood that the adhesive layer 14 can also extend between the shielding structure 6 located in the bonding area 10 and the flexible circuit board 5.

It can be understood that a rubber frame 15 is further arranged between the array substrate 2 and the color film substrate 4 to seal the liquid crystal layer 3.

Specifically, the flexible circuit board 5 comprises but is not limited to COF.

In a specific embodiment, the display panel 1 further comprises a circuit board 16 located on a side of the flexible circuit board 5 away from the array substrate 2. The circuit board 16 comprises a PCB board, but is not limited to this.

It can be understood that the flexible circuit board in the embodiments of the present application still adopts a traditional front bonding process, while the flexible circuit board (COF) in the liquid crystal display panel shown in FIG. 1 adopts a back bonding process. The back bonding process does not belong to the traditional bonding method, and relevant equipment needs to be transformed, and a new line body needs to be redesigned to complete it. Moreover, in the back bonding process, components on the circuit board (PCB) and the flexible circuit board are on different sides of the circuit board, so it is difficult to process. Therefore, the embodiments of the present application can be bound with mass production equipment and process, which is conducive to improving production efficiency.

In the present embodiments, the shielding structure 6 is hidden under the first polarizer 7, which simplifies technical difficulties of a four-sided frameless display panel 1, maintains a consistency of edge colors of the four sides of the front of the display panel, reduces a color difference and the appearance difference of the four sides of the display panel 1, and is conducive to improving a picture quality of the whole machine. Moreover, based on the traditional (mainstream) OC display panel 1 process, the present application sets the shielding structure 6 in the bonding area 10 below the first polarizer 7. On one hand, compared with a four-sided frameless display panel scheme with the array substrate facing upward, the present application has little change to a cell process of the display panel, and there is no need to design the cell specifically, which can greatly reduce cost. On the other hand, a scheme of the present application has good compatibility and can be applied to most OC display panel processes.

Figure 3:
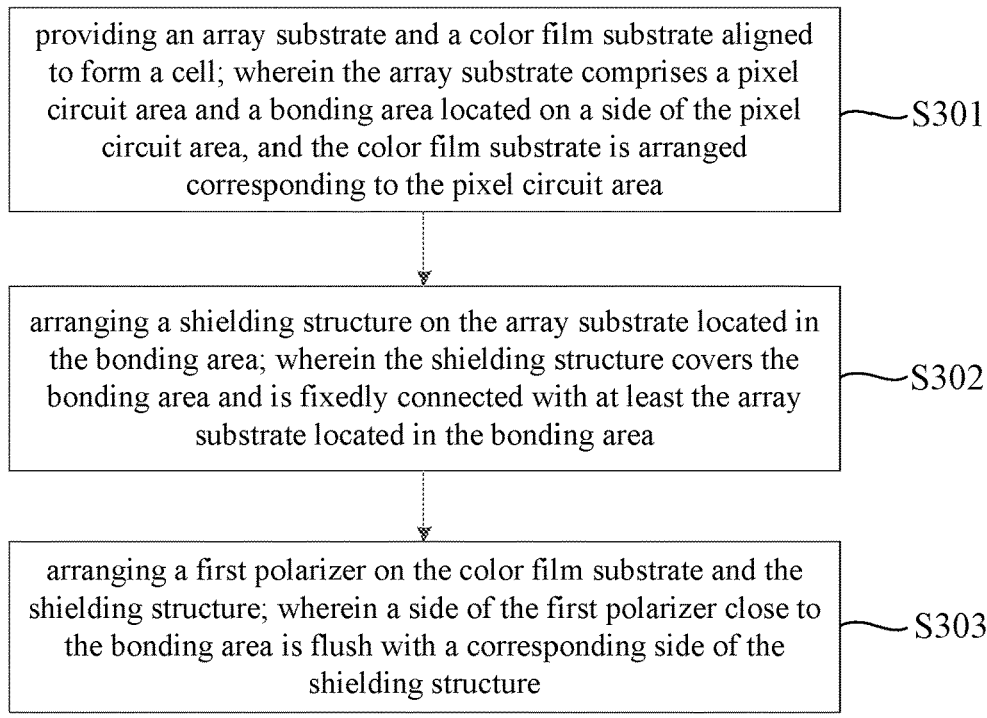
FIG. 3 is a schematic flow diagram of a manufacturing method of the display panel provided by the embodiments of the present application.

As shown in FIG. 3, the embodiments of the present application provide a manufacturing method of the display panel in the foregoing embodiments, comprising steps S301 to S303.

Step S301: providing an array substrate and a color film substrate aligned to form a cell; wherein the array substrate comprises a pixel circuit area, and a bonding area located on a side of the pixel circuit area, and the color film substrate is arranged corresponding to the pixel circuit area.

Figure 4:
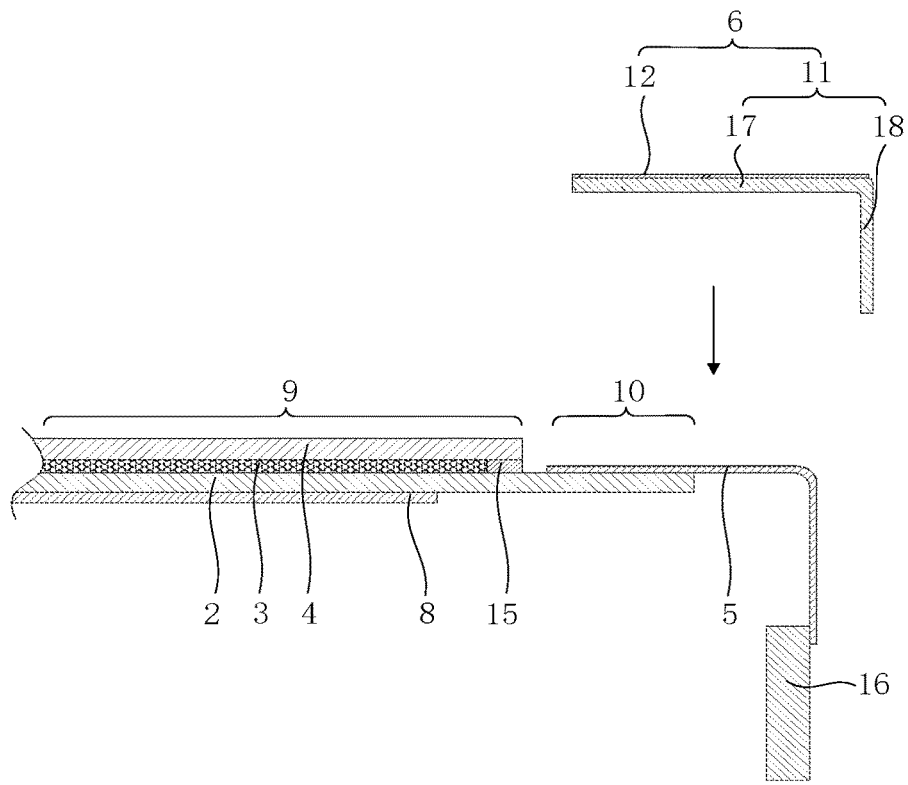
FIG. 4 is a schematic structural diagram of a shielding structure and a liquid crystal cell in the manufacturing method of the display panel provided by the embodiments of the present application.

Specifically, as shown in FIG. 4, a liquid crystal layer 3 is further sandwiched between the array substrate 2 and the color film substrate 4 to form a liquid crystal cell. The present application can adopt a conventional cell process.

Step S302: arranging a shielding structure on the array substrate located in the bonding area; wherein the shielding structure covers the bonding area and is fixedly connected with at least the array substrate located in the bonding area.

Figure 5:
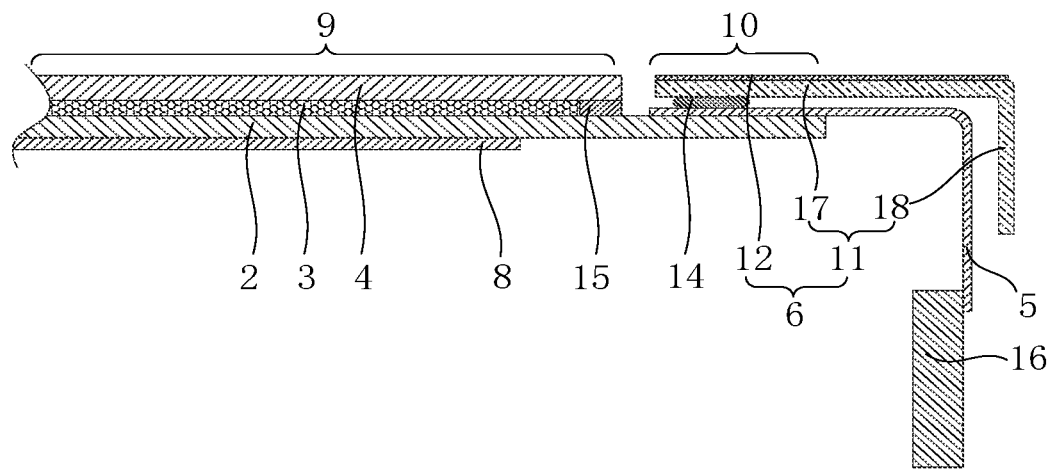
FIG. 5 is a schematic structural diagram after a shielding structure is fixed in a manufacturing method of a display panel provided by the embodiments of the present application.

Specifically, as shown in FIGS. 4 and 5, the shielding structure 6 comprises a main structure 11 covering the bonding area 10, and a toner layer 12 arranged on the main structure 11. The step S302 comprises following steps:

Providing a main structure 11. Wherein the main structure 11 comprises a first main part 17 arranged corresponding to the bonding area 10, and a second main part 18 connected at a right angle to the first main part 17;

Forming a toner layer 12 on a surface of the first main part 17. Wherein the toner layer 12 and the main structure 11 constitute the shielding structure 6;

Bonding a flexible circuit board 5 in the bonding area 10 of the array substrate 2, and bending a part of the flexible circuit board 5 away from the bonding area 10 to the side of the array substrate 2; and Fixing the first main part 17 on the array substrate 2 and the flexible circuit board 5 located in the bonding area 10 so that the toner layer 12 is located on a side of the first main part 17 away from the array substrate 2, and the second main part 18 at least partially covers the flexible circuit board 5 located on the side of the array substrate 2.

Specifically, forming the toner layer 12 on the surface of the first main part 17 comprises following steps: performing surface printing (e.g., silk screen coating) on the side of the first main part 17 away from the array substrate 2 to form the toner layer 12. A material of the toner layer 12 is an ink material.

In other embodiments, the toner layer 12 can also be formed by metal appearance treatment (such as film coating/oxidation).

Specifically, as shown in FIG. 4, the flexible circuit board 5 can be bound to the bonding area 10 of the array substrate 2 by a conventional front bonding process. Compared with a back bonding process, the present application can bond the flexible circuit board 5 using mass production equipment and process, which is conducive to improving production efficiency and saving cost.

Specifically, the flexible circuit board 5 comprises but is not limited to COF.

In a specific embodiment, a circuit board 16 is bound on a side of the flexible circuit board 5 away from the array substrate 2. Specifically, the circuit board 16 comprises but is not limited to a PCB board.

Specifically, as shown in FIG. 5, the first main part 17 can be fixedly connected with the array substrate 2 through an adhesive layer 14. A material of the adhesive layer 14 comprises but is not limited to UV curing adhesive. It is understood that the adhesive layer 14 can also extend between the first main part 17 and the flexible circuit board 5.

Specifically, the first main part 17 and the second main part 18 are connected in an inverted L-shape, and the first main part 17 and the second main part 18 are formed as a whole. The main structure 11 composed of the first main part 17 and the second main part 18 can effectively protect the flexible circuit board 5 and prevent the flexible circuit board 5 from being scratched or damaged by pulling.

Step S303: arranging a first polarizer on the color film substrate and the shielding structure; wherein a side of the first polarizer close to the bonding area is flush with a corresponding side of the shielding structure.

Figure 7:
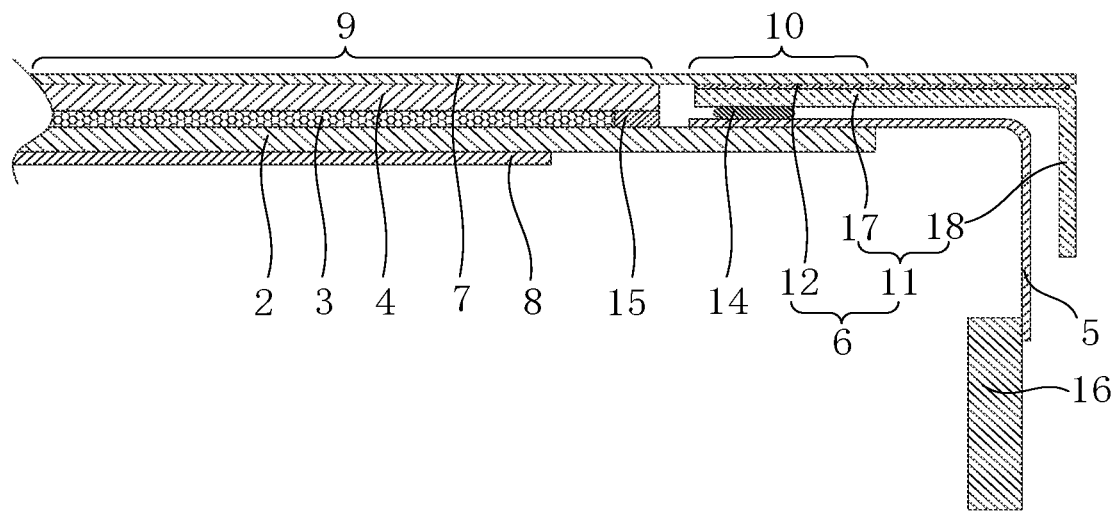
FIG. 7 is a schematic structural diagram after forming a first polarizer in a manufacturing method of a display panel provided by the embodiments of the present application.

It can be understood that, as shown in FIG. 7, an orthographic projection of the first polarizer 7 on the array substrate 2 covers an orthographic projection of the shielding structure 6 on the array substrate 2.

Figure 6:
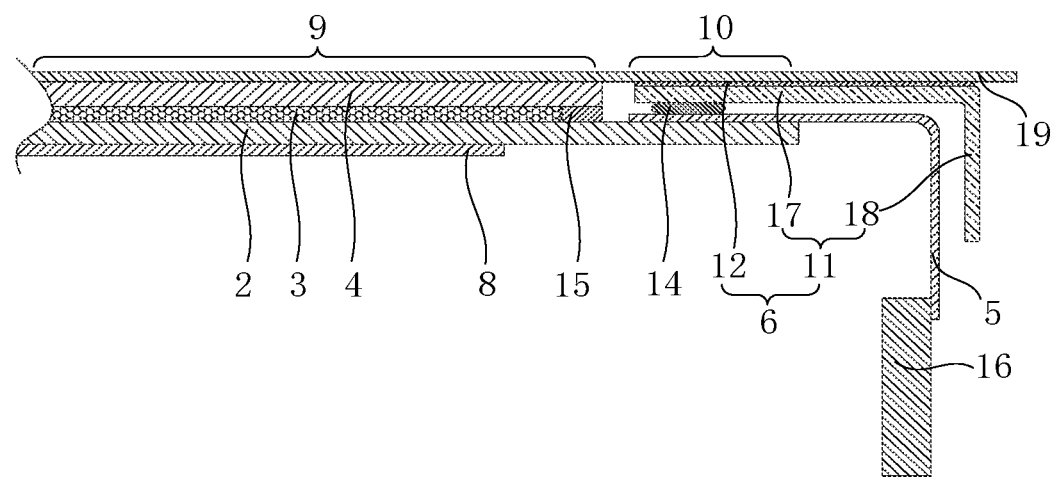
FIG. 6 is a schematic structural diagram after attaching a polarizer on a side of a color film substrate in a manufacturing method of a display panel provided by the embodiments of the present application.

Specifically, the step S303 comprises following steps:

As shown in FIG. 6, a polarizer 19 with a length exceeding the shielding structure 6 is attached to the color film substrate 4 and the shielding structure 6; and As shown in FIG. 7, a part of the polarizer 19 beyond the shielding structure 6 is cut (e.g., laser cutting), to form the first polarizer 7.

Figure 8:
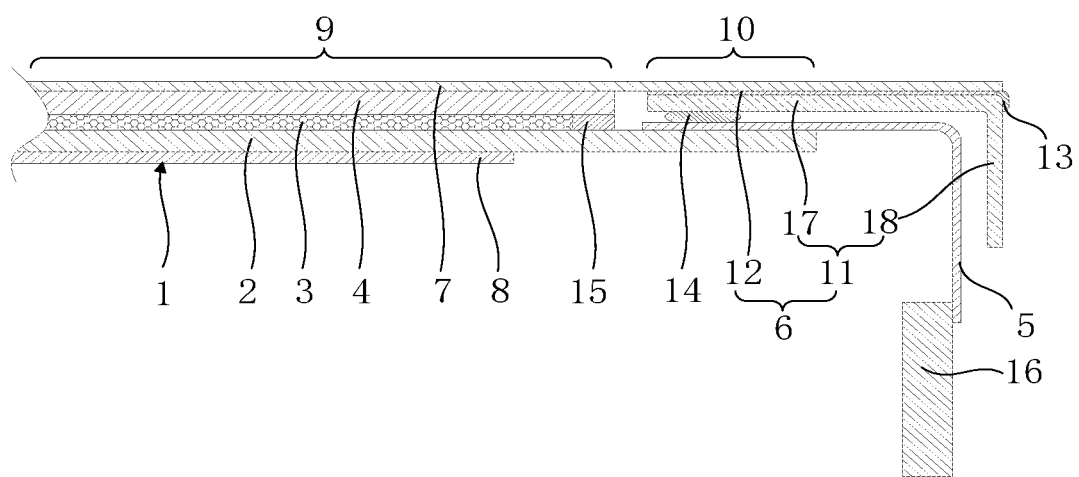
FIG. 8 is a schematic structural diagram after forming a decorative coating layer in a manufacturing method of a display panel provided by the embodiments of the present application.

Specifically, the manufacturing method further comprises following steps:

As shown in FIG. 4, arranging a second polarizer 8 on a side of the array substrate 2 away from the color film substrate 4; and As shown in FIG. 8, arranging a decorative coating layer 13 on a side of the toner layer 12 away from the pixel circuit area 9; wherein the decorative coating layer 13 extends to a side part of the main structure 11.

Specifically, the second polarizer 8 can be formed in step S301. The decorative coating layer 13 is formed after step S303.

Specifically, a material of the decorative coating layer 13 comprises UV curing adhesive or similar hot melt adhesive. The decorative coating layer 13 can further optimize an appearance of the display panel 1.

In the present embodiments, in the present embodiment, the shielding structure 6 is hidden under the first polarizer 7, which simplifies technical difficulties of the four-sided frameless display panel 1, maintains the consistency of the edge colors of the four sides of the front of the display panel, reduces the color difference and the appearance difference of the four sides of the display panel 1, and is conducive to improving the picture quality of the whole machine. Moreover, based on the traditional (mainstream) OC display panel 1 process, the present application sets the shielding structure 6 in the bonding area 10 below the first polarizer 7. On one hand, compared with the four-sided frameless display panel scheme with the array substrate facing upward, the present application has little change to a cell process of the display panel, and there is no need to design the cell specifically, which can greatly reduce cost. On the other hand, the scheme of the present application has good compatibility and can be applied to most OC display panel processes.

Figure 9:
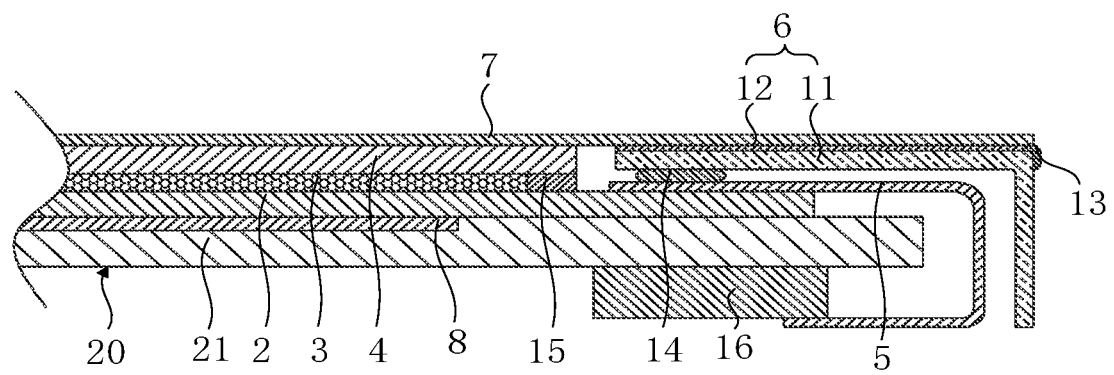
FIG. 9 is a partial schematic structural diagram of a display device provided by the embodiments of the present application.

As shown in FIG. 2 and FIG. 9, the embodiments of the present application provide a display device 20. The display device 20 comprises a display panel 1 described in the above embodiments and a backlight module 21. Wherein, the display panel 1 is located on the backlight module 21, and the color film substrate 4 is located on a side of the array substrate 2 away from the backlight module 21.

Specifically, the display device 20 further comprises a housing (not shown) located on a periphery of the display panel 1 and the backlight module 21.

In the present embodiments, in the present embodiment, the shielding structure 6 is hidden under the first polarizer 7, which simplifies technical difficulties of the four-sided frameless display panel 1, maintains the consistency of the edge colors of the four sides of the front of the display panel, reduces the color difference and the appearance difference of the four sides of the display panel 1, and is conducive to improving the picture quality of the whole machine. Moreover, based on the traditional (mainstream) OC display panel 1 process, the present application sets the shielding structure 6 in the bonding area 10 below the first polarizer 7. On one hand, compared with the four-sided frameless display panel scheme with the array substrate facing upward, the present application has little change to a cell process of the display panel, and there is no need to design the cell specifically, which can greatly reduce cost. On the other hand, the scheme of the present application has good compatibility and can be applied to most OC display panel processes.

In the above embodiments, the description of each embodiment has its own emphasis. For the parts not detailed in one embodiment, please refer to the relevant description of other embodiments.

The display panel, the manufacturing method of the display panel, and the display device are described in detail above. And in this paper, specific examples are applied to explain the principle and implementation mode of the application. The above embodiments are only examples of the implementation of the present invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present application.

What is claimed is:

1. A display panel, comprising:
    an array substrate, comprising a pixel circuit area, and a bonding area located on a side of the pixel circuit area;
    a color film substrate, arranged opposite to the pixel circuit area of the array substrate;
    a shielding structure, covering the bonding area and fixedly connected with at least the array substrate located in the bonding area;
    a first polarizer, located on the color film substrate and the shielding structure, and a side of the first polarizer close to the bonding area being flush with a corresponding side of the shielding structure; and
    a flexible circuit board, wherein a part of the flexible circuit board is bound and connected with the bonding area of the array substrate, and another part is bent to a side of the array substrate;
    wherein the shielding structure comprises a main structure covering the bonding area, and a toner layer arranged on the main structure; the main structure further extends to the side of the array substrate and is arranged parallel to the side of the array substrate, the main structure on the side of the array substrate at least partially covers the flexible circuit board on the side of the array substrate; a material of the main structure comprises a metal material; and a gap is provided between the main structure and the flexible circuit board.

2. The display panel according to claim 1, wherein a material of the toner layer comprises an ink material.

3. The display panel according to claim 1, wherein a decorative coating layer is arranged on a side of the toner layer away from the pixel circuit area; the decorative coating layer extends to a side part of the main structure.

4. The display panel according to claim 3, wherein a material of the decorative coating layer comprises a UV curing adhesive.

5. The display panel according to claim 1, wherein an adhesive layer is arranged between the shielding structure located in the bonding area and the array substrate.

6. The display panel according to claim 1, wherein the display panel further comprises a liquid crystal layer located between the array substrate and the color film substrate, and a second polarizer located on a side of the array substrate away from the liquid crystal layer.

7. A manufacturing method of a display panel, comprising following steps:
    providing an array substrate and a color film substrate aligned to form a cell; wherein the array substrate comprises a pixel circuit area, and a bonding area located on a side of the pixel circuit area, and the color film substrate is arranged corresponding to the pixel circuit area;
    arranging a shielding structure on the array substrate located in the bonding area;
    wherein the shielding structure covers the bonding area and is fixedly connected with at least the array substrate located in the bonding area; and
    arranging a first polarizer on the color film substrate and the shielding structure; wherein a side of the first polarizer close to the bonding area is flush with a corresponding side of the shielding structure;
    wherein the step of arranging the shielding structure on the array substrate located in the bonding area comprises following steps:
    providing a main structure; wherein the main structure comprises a first main part arranged corresponding to the bonding area, and a second main part connected at a right angle to the first main part;
    forming a toner layer on a surface of the first main part; wherein the toner layer and the main structure constitute the shielding structure;
    bonding a flexible circuit board in the bonding area of the array substrate, and bending a part of the flexible circuit board away from the bonding area to a side of the array substrate; and
    fixing the first main part on the array substrate and the flexible circuit board located in the bonding area, so that the toner layer is located on a side of the first main part away from the array substrate, and the second main part at least partially covers the flexible circuit board located on the side of the array substrate; and
    wherein a material of the main structure comprises a metal material; and a gap is provided between the main structure and the flexible circuit board.

8. The manufacturing method of the display panel according to claim 7, wherein a material of the toner layer comprises an ink material.

9. The manufacturing method of the display panel according to claim 7, wherein the first main part is fixed on the array substrate and the flexible circuit board located in the bonding area through an adhesive layer.

10. The manufacturing method of the display panel according to claim 7, wherein the manufacturing method further comprises following steps:
    arranging a second polarizer on a side of the array substrate away from the color film substrate; and
    arranging a decorative coating layer on a side of the toner layer away from the pixel circuit area; wherein the decorative coating layer extends to a side part of the main structure.

11. The manufacturing method of the display panel according to claim 10, wherein a material of the decorative coating layer comprises a UV curing adhesive.

12. A display device, comprising a display panel and a backlight module; the display panel, comprising:
    an array substrate, comprising a pixel circuit area, and a bonding area located on a side of the pixel circuit area;
    a color film substrate, arranged opposite to the pixel circuit area of the array substrate;
    a shielding structure, covering the bonding area and fixedly connected with at least the array substrate located in the bonding area;
    a first polarizer, located on the color film substrate and the shielding structure, and a side of the first polarizer close to the bonding area being flush with a corresponding side of the shielding structure; and
    a flexible circuit board, wherein a part of the flexible circuit board is bound and connected with the bonding area of the array substrate, and another part is bent to a side of the array substrate;

wherein the shielding structure comprises a main structure covering the bonding area, and a toner layer arranged on the main structure; the main structure further extends to the side of the array substrate and is arranged parallel to the side of the array substrate, the main structure on the side of the array substrate at least partially covers the flexible circuit board on the side of the array substrate; a material of the main structure comprises a metal material; and a gap is provided between the main structure and the flexible circuit board;

wherein the display panel is located on the backlight module, and the color film substrate is located on a side of the array substrate away from the backlight module.

13. The display device according to claim 12, wherein a material of the toner layer comprises an ink material.

14. The display device according to claim 12, wherein a decorative coating layer is arranged on a side of the toner layer away from the pixel circuit area; the decorative coating layer extends to a side part of the main structure.

15. The display device according to claim 14, wherein a material of the decorative coating layer comprises a UV curing adhesive.

16. The display device according to claim 12, wherein an adhesive layer is arranged between the shielding structure located in the bonding area and the array substrate.

17. The display device according to claim 12, wherein the display panel further comprises a liquid crystal layer located between the array substrate and the color film substrate, and a second polarizer located on a side of the array substrate away from the liquid crystal layer.

* * * * *